(12) United States Patent
Kageyama et al.

(10) Patent No.: US 7,930,943 B2
(45) Date of Patent: Apr. 26, 2011

(54) DIFFERENTIAL PRESSURE SENSOR

(75) Inventors: Masato Kageyama, Oyama (JP);
Mitsumasa Akashi, Oyama (JP)

(73) Assignee: Komatsu Ltd., Tokyo (JP)

( * ) Notice: Subject to any disclaimer, the term of this patent is extended or adjusted under 35 U.S.C. 154(b) by 105 days.

(21) Appl. No.: 12/449,025

(22) PCT Filed: Jan. 11, 2008

(86) PCT No.: PCT/JP2008/050238
§ 371 (c)(1),
(2), (4) Date: Jul. 21, 2009

(87) PCT Pub. No.: WO2008/093526
PCT Pub. Date: Aug. 7, 2008

(65) Prior Publication Data
US 2010/0043563 A1  Feb. 25, 2010

(30) Foreign Application Priority Data
Jan. 30, 2007  (JP) .................. 2007-019528

(51) Int. Cl.
*G01L 13/02* (2006.01)
(52) U.S. Cl. .................................... 73/716; 73/736
(58) Field of Classification Search .................. None
See application file for complete search history.

(56) References Cited

U.S. PATENT DOCUMENTS

| | | | | |
|---|---|---|---|---|
| 3,575,054 A | * | 4/1971 | Glista | 73/701 |
| 4,072,058 A | * | 2/1978 | Whitehead, Jr. | 73/720 |
| 4,393,714 A | * | 7/1983 | Schmidt | 73/718 |
| 4,602,513 A | | 7/1986 | Hirota et al. | |
| 4,606,229 A | | 8/1986 | Spence | |
| 7,266,261 B2 | * | 9/2007 | Arias Vidal et al. | 385/13 |
| 7,770,469 B2 | * | 8/2010 | Nyfors et al. | 73/861.42 |

FOREIGN PATENT DOCUMENTS

| | | |
|---|---|---|
| JP | 02-145750 U | 12/1990 |
| JP | 04-113044 U | 10/1992 |
| JP | 11-025826 A | 1/1999 |
| JP | 2000-082369 A | 3/2000 |

OTHER PUBLICATIONS

International Search Report mailed on Apr. 15, 2008 for the corresponding International patent application No. PCT/JP2008/050238 (English translation enclosed).

* cited by examiner

*Primary Examiner* — Andre J Allen
(74) *Attorney, Agent, or Firm* — Posz Law Group, PLC

(57) ABSTRACT

In order to reduce hysteresis and other noise components included in the output signal characteristic of a differential pressure sensor, an elastic reaction member which operates together with a diaphragm provided in a chamber of the differential pressure sensor includes a contact portion which contacts the diaphragm, and a plurality of springs which are arranged symmetrically about the contact portion. Each of the springs is a plate shaped or linear shaped spring which is bent into the form of a letter C, U, J, or V, and has one of its ends fixed to a wall which defines the chamber, while its other end is connected to the contact portion. When the contact portion shifts together with the diaphragm, the deformations of the plurality of springs are mutually balanced, so that rotation and horizontal deviation of the contact portion with respect to the diaphragm is suppressed.

20 Claims, 15 Drawing Sheets

DIFFERENTIAL PRESSURE SENSOR

CROSS REFERENCE TO RELATED APPLICATIONS

This application is a U.S. national stage application of PCT/JP2008/050238 filed on Jan. 11, 2008, and claims priority to, and incorporates by reference, Japanese Patent Application No. 2007-019528 filed on Jan. 30, 2007.

TECHNICAL FIELD

The present invention relates to a differential pressure sensor which detects the amount of displacement of a diaphragm which is disposed between two chambers, and outputs a pressure difference signal.

BACKGROUND ART

Differential pressure sensors which detect the amount of displacement of a diaphragm which is disposed between two chambers, and output a pressure difference signal, are, for example, disclosed in Patent Citations #1 and #2. The differential pressure sensor which is disclosed in Patent Citation #1 has a cantilevered plate spring one end of which is fixed to a housing and the other end of which contacts the diaphragm, and the position of the point of contact between the cantilevered plate spring and the diaphragm changes according to the pressure difference between the chambers, with an electrical signal having a level which corresponds to the position of this point of contact being outputted as a pressure difference signal. The cantilevered plate spring described above is formed in a shape which, as a whole, extends in a single direction from its fixed end to its contact point with the diaphragm.

And, in the differential pressure sensor which is disclosed in Patent Citation #2, a piston is contacted against a diaphragm, this piston is elastically pushed in the direction of the diaphragm by a coil spring, and an electrical signal having a level which corresponds to the position of this piston is outputted as a pressure difference signal. In order always to keep the coil spring in a dead straight form, the coil spring is inserted into a narrow tube.

Patent Citation #1: Japanese Laid-Open Patent Publication Showa 61-230037 (for example FIGS. 2 and 8);
Patent Citation #2: Japanese Laid-Open Utility Model Publication Heisei 4-113044.

DISCLOSURE OF INVENTION

Technical Problem

A certain noise component may be included in the pressure difference—output signal characteristic of the pressure differential signal which is outputted from this differential pressure sensor, and this may constitute a hindrance to accurate pressure differential detection. In particular, in an application which attempts to detect minute pressure differences at high accuracy, this type of noise component characteristic is required to be extremely low. One noise component of this type is a hysteresis characteristic (a discrepancy between the curve of change of the output signal level when the pressure difference rises, and the curve of change of the output signal level when the pressure difference drops). A principal cause of such a hysteresis characteristic noise component can be sliding friction between the components or unnecessary deformation of the diaphragm, caused when the diaphragm moves.

For example, with the differential pressure sensor disclosed in Patent Citation #1, when the diaphragm moves, the cantilevered plate spring rotates (tilts) around its fixed end as a center, so that the relative position of the cantilevered plate spring with respect to the diaphragm changes (in other words, sliding takes place between the cantilevered plate spring and the diaphragm). Due to this, sliding friction occurs between the cantilevered plate spring and the diaphragm. In addition to this, the above described rotation of the cantilevered plate spring changes the relative angle between the cantilevered plate spring and the diaphragm, and thus changes the direction of the reaction force which is applied to the diaphragm from the cantilevered plate spring. Due to this, the diaphragm experiences a reaction force in a direction which is different from the direction opposite to its direction of shifting, and therefore useless deformation thereof takes place.

And, with the differential pressure sensor disclosed in Patent Citation #2, when the diaphragm moves, the coil spring is extended or compressed, and thus the coil spring contacts against the wall surface of the narrow tube which holds it, and sliding friction takes place between them.

Accordingly, an object of the present invention is to reduce the noise component included in the output signal characteristic of a differential pressure sensor.

Another object of the present invention is to reduce the sliding friction between components when the diaphragm moves.

Yet another object of the present invention is to reduce useless deformation of the diaphragm when the diaphragm moves.

Technical Solution

According to one aspect of the present invention, a differential pressure sensor comprises: a housing comprising a first wall which defines a first chamber and a second wall which defines a second chamber; a diaphragm disposed within the housing between the first chamber and the second chamber, and comprising a movable part which can be moved along a certain shift axis upon receipt of a pressure difference between the first chamber and the second chamber; an elastic reaction member which applies an elastic reaction force to the movable part; and a transducer which outputs an electrical signal according to the position of the movable part along said shift axis. The elastic reaction member comprises a contact portion which contacts the movable part and is shiftable together with the movable part, and a plate shaped or linear spring comprising a loose end which is connected to the contact portion, and a fixed end which is connected to the housing. The spring comprises a first spring portion and a second spring portion which are connected in series between the loose end and the fixed end, with the first spring portion extending in a first direction from the loose end to a mutual connection point between the first spring portion and the second spring portion, and the second spring portion extending in a second direction from the mutual connection point to the fixed end. And the first spring portion and the second spring portion are disposed so that the first direction and the second direction mutually subtend an obtuse angle upon a two dimensional coordinate plane which is orthogonal to the shift axis.

With this differential pressure sensor, the above described first and second spring portions which are comprised in the spring of the above described elastic reaction member are disposed in a directional relationship as described above. That is to say, the above described first and second spring portions are disposed so that, upon the above described two dimensional coordinate plane, they extend in generally opposite directions. In this specification, this type of construction for a spring which is employed is termed a "balanced construction of a spring". By employing an elastic reaction member with this "balanced construction of a spring", when the movable part of the diaphragm and the contact portion of the elastic reaction member shift together, the first and the second spring portions rotate in mutually opposite directions, so that their rotations mutually balance one another to some extent, and thereby rotation of the contact portion with respect to the diaphragm is suppressed. As a result, useless deformation of the diaphragm is suppressed, so that noise in the pressure differential signal which originates in deformation of the diaphragm is reduced, and accordingly the accuracy of pressure differential detection is enhanced.

A typical example of a spring in which such a "balanced construction of a spring" is employed is a plate shaped or linear spring which is shaped as a letter "C", "U", "V", or "J".

In a preferred embodiment, the length of said second spring portion is greater than the length of the first spring portion. Due to this, it becomes easier to enhance the resolution of pressure difference detection, because the length of the stroke of the diaphragm is made to be longer.

In a preferred embodiment, said elastic reaction member comprises a plurality of the springs, each of which has one of the loose ends which is connected in common to the contact portion; and the plurality of springs are arranged so that the direction that each spring among the plurality of springs and the direction that at least one other spring extends from the contact portion mutually subtend an obtuse angle upon the two dimensional coordinate plane.

In this specification, this type of construction for the plurality of springs is termed a "balanced construction in which a plurality of springs are employed". By employing an elastic reaction member with this "balanced construction in which a plurality of springs are employed", when the movable part of the diaphragm and the contact portion of the elastic reaction member shift together, the plurality of spring portions and the contact portions are caused to rotate and deviate horizontally in mutually opposite directions, so that their rotations and horizontal deviations mutually balance one another to some extent, and thereby rotation and horizontal deviation of the contact portion with respect to the diaphragm is suppressed. As a result, useless sliding between the diaphragm and the elastic member is suppressed, so that the hysteresis characteristic of the pressure difference signal which originates in this sliding is reduced, and accordingly the accuracy of pressure differential detection is enhanced.

A typical example of a "balanced construction in which a plurality of springs are employed" is one in which the plurality of springs are arranged symmetrically with respect to the contact portion.

In a preferred embodiment, the elastic reaction member further comprises a branch portion which is connected to the contact portion, and which is separate from the spring; and the transducer is adapted to output the electrical signal in correspondence to the position of the branch portion. By employing this type of structure, no impediment affects the accuracy of detection, since the part such as the branch portion which is attached for position detection by the transducer does not exert any substantial influence upon the elastic characteristics of the elastic reaction member. As a variant example, it would also be acceptable to provide the branch portion described above to the spring described above.

In a preferred embodiment, the elastic reaction member is disposed in the first chamber or in the second chamber; and the transducer comprises: a shift mass which is fitted to the branch portion within the first chamber or the second chamber; and a detection element disposed exterior to the first chamber and the second chamber, which detects the position of the shift mass within the first chamber or the second chamber through the first wall or the second wall in a non-contact manner. If this type of structure is employed, then, since the detection element is disposed exterior to the chambers, accordingly this differential pressure sensor can be applied even to an application in which the fluid which is introduced into the chambers is one which desirably should not come into direct contact with the detection element, such as for example oil or water.

And, according to a second aspect of the present invention, a differential pressure sensor comprises: a housing comprising a first wall which defines a first chamber and a second wall which defines a second chamber; a diaphragm disposed within the housing between the first chamber and the second chamber, and comprising a movable part which can be moved along a certain shift axis upon receipt of a pressure difference between the first chamber and the second chamber; an elastic reaction member which applies an elastic reaction force to said movable part; and a transducer which outputs an electrical signal according to the position of the movable part along the shift axis. The elastic reaction member comprises a contact portion which contacts the movable part of the diaphragm and is shiftable together with the movable part, and a plurality of plate shaped or linear springs, each of which comprises a loose end which is connected in common to the contact portion, and a fixed end which is connected to the housing. And the plurality of springs are arranged so that the direction that each spring among the plurality of springs and the direction that at least one other spring extend from the contact portion mutually subtend an obtuse angle upon a two dimensional coordinate plane which is orthogonal to the shift axis.

With this differential pressure sensor, the above described "balanced construction in which a plurality of springs are employed" is employed for the elastic reaction member. With this "balanced construction in which a plurality of springs are employed", useless sliding between the diaphragm and the elastic reaction member is suppressed, so that the hysteresis characteristic of the pressure differential signal which originates in this sliding friction is reduced, and accordingly the accuracy of pressure differential detection is enhanced.

ADVANTAGEOUS EFFECTS

According to the present invention, the noise component included in the output signal characteristic of the differential pressure sensor is reduced, and the accuracy of the pressure difference detection which it provides is enhanced.

BEST MODE FOR CARRYING OUT THE INVENTION

In the following, several preferred embodiments of the present invention will be explained with reference to the drawings.

FIG. 1 is a sectional view of a differential pressure sensor according to a first embodiment of the present invention. And FIG. 2 is a perspective view of an elastic reaction member which is fitted to this differential sensor according to this embodiment.

As shown in FIG. 1, this differential pressure sensor 100 has a housing 102 which is made from a rigid material, and this housing 102 has a first wall 106 which defines a first chamber 104 and a second wall 110 which defines a second chamber 108. The first chamber 104 is a low pressure chamber into which a fluid at a low pressure (for example, working oil of a oil pressure circuit at a low pressure) is introduced, while, by contrast, the second chamber 108 is a high pressure chamber into which a fluid at a high pressure (for example, working oil of a oil pressure circuit at a high pressure) is introduced from an inlet aperture 109. As one example of how this differential pressure sensor 100 may be used, the housing 102 may be fitted directly to a test subject (for example, some oil filter in a oil circuit), and fluids at two different pressures within this test subject (for example, working oil before it passes through a filter element within the oil filter, and after it has passed through the filter element) may be introduced into the chambers 104 and 108 respectively.

A diaphragm 112, which is substantially shaped as a circular plate, is disposed between the low pressure chamber 104 and the high pressure chamber 108. This diaphragm 112 has a movable part 114 in its central portion, and this movable part 114 can shift in the horizontal direction in FIG. 1 upon receipt of the pressure difference between the low pressure chamber 104 and the high pressure chamber 108. Here, for the convenience of explanation, an orthogonal X-Y-Z coordinate system 200 is defined. According to this coordinate system 200, the movable part 114 can be shifted along the X axis direction.

The material of the diaphragm 112 is typically a material which is very flexible such as rubber, but a material which is only slightly flexible, such as a metal, will also be acceptable, provided that the construction allows the movable part 114 to be movable. It is desirable for the diaphragm 112 to be able to support itself, in other words, for the diaphragm 112 not to be deformed by the action of gravity, even if the attitude of the differential pressure sensor 100 with respect to gravity changes. At a head end portion thereof, the movable part 114 of the diaphragm 112 is provided with a ball 116 which is made of a material which is resistant to wear, and this ball 116 projects from the head end portion of the movable part 114 towards the low pressure chamber 104.

An elastic reaction member 118 is disposed within the low pressure chamber 104, for applying an elastic reaction force to the movable part 114 of the diaphragm 112 in the direction opposite to its shifting direction. As shown in FIG. 1 and FIG. 2, this elastic reaction member 118 comprises a contact portion 120 and a spring 122. The spring 122 is a long and narrow plate spring which is, schematically, bent into the shape of a letter "C" or the shape of a letter "U" along the direction in which it is thinnest, and is connected at one end 122A thereof (hereinafter termed its "loose end") to the contact portion 120, while being fixed to the housing 102, for example by a bolt, at its other end 122B (hereinafter termed its "fixed end"). It should be understood that, instead of using a plate spring as the spring 122, it would also be acceptable to use a linear spring. This spring 122 exerts its elastic reaction force towards the movable part 114 on the contact portion 120, so that its contact portion 120 is always continuously contacted against the ball 116 of the movable part 114 of the diaphragm 112.

As shown in FIG. 2, this elastic reaction member 118 further comprises a branch portion 124 which is connected to the contact portion 120, and which is different from the above described spring 122. A shift mass 126 is fixed upon this branch portion 124, and this shift mass 126 is one component of a transducer for generating an electrical pressure difference signal which corresponds to the position of the contact portion 120 along the X axis, in other words to the amount of displacement. As shown in FIG. 1, this shift mass 126 (a permanent magnet) is located within the low pressure chamber 104 in the neighborhood of a thinned portion 106A of the first wall 106 which is parallel to the X axis. When the contact portion 120 shifts along the X axis together with the movable part 114, the shift mass 126 shifts parallel to the inner surface of this thinned portion 106A of the first wall 106. A non contact detection element 128, which is another component of the transducer, is located outside the low pressure chamber 104, in the neighborhood of the thinned portion 106A of the first wall 106. This non contact detection element 128 detects the position of the shift mass 126 (i.e. the permanent magnet) upon the branch portion 124 along the X axis (to put it in another manner, the position of the movable part 114 of the diaphragm 112) through the first wall 106 in a non-contact manner, and generates a voltage signal (a pressure difference signal) which has a voltage level corresponding to this detected position. It should be understood that, as a variant example, it would also be acceptable to provide a branch portion to which the shift mass 126 is fixed at some spot upon the spring 122.

The pressure difference signal which is outputted from the non contact detection element 128 is outputted to the exterior of the differential pressure sensor 100 via wiring 130. The level of this pressure difference signal indicates the magnitude of the pressure difference between the chambers 104 and 108.

In this embodiment, for the transducer described above, a device is employed which uses the non-contact detection principle of converting magnetic field intensity into a voltage signal by utilizing the Hall effect, and the shift mass 126 is implemented as a permanent magnet which generates a magnetic field, while the non-contact detection element 128 is implemented as a Hall IC. The Hall IC which is utilized for the non-contact detection element 128 senses the intensity of the magnetic field generated by the shift mass 126 permanent magnet, and outputs a voltage signal having a voltage level which corresponds to this intensity as a pressure difference signal. It would also be acceptable to employ, as the transducer described above, an element which uses some other non-contact detection principle.

The non-contact detection element 128 such as a Hall IC is disposed exterior to the chambers 104 and 108. Due to this, even if, as a pressurized fluid, a liquid such as working oil of a hydraulic circuit or working water of a water pressure circuit is introduced into the chambers 104 and 108, this liquid cannot exert any negative influence upon the electric circuitry of the non-contact detection element 128, because it does not come into contact with the non-contact detection element 128. Accordingly, the differential pressure sensor 100 according to this embodiment can be used for detecting pressure differential, not only in an air pressure circuit, but also in a liquid pressure circuit such as a hydraulic (oil pressure) circuit or a water pressure circuit.

Next, the construction of the elastic reaction member 118 described above, and in particular the construction of the spring 122 which is connected to the contact portion 120, will be described in detail.

A construction which, in this specification, is termed a "balanced construction" is employed for the spring 122 of the elastic reaction member 118. In other words, what is meant by this balanced construction for the spring 122 is that, when the spring 122 deforms by the movable part 114 of the diaphragm 112 and the contact portion 120 of the elastic reaction member 118 shifting along the X axis, it is arranged to suppress relative rotation (i.e. inclination) of the contact portion 120 with respect to the movable part 114, due to the deformation of some portion of the spring 122 and the deformation of some other portion balancing one another (i.e. performing mutual cancellation). This balanced construction will now be explained below in concrete terms.

As shown in FIG. 2, between its loose end 122A and its fixed end 122B, the spring 122 has a first spring portion 122C and a second spring portion 122D which are connected together in series. The first spring portion 122C extends from the loose end 122A to the mutual connection point 122E between the first and second spring portions 122C and 122D, in a direction shown by an arrow sign 202 (hereinafter termed the "first direction"). On the other hand, the second spring portion 122D extends from the mutual connection point 122E to the fixed end 122B, in a direction shown by an arrow sign 204 (hereinafter termed the "second direction"). As shown in FIG. 3A, upon the coordinate plane (i.e. the Y-Z plane) which is orthogonal to the shift axis of the movable part 114 (in other words, to the X axis), the angle 206 which is subtended between the first direction 202 and the second direction 204 is 180° (in other words, they are exactly opposite to one another). It should be understood that this angle 206 which is subtended between the first direction 202 and the second direction 204 upon the Y-Z plane need not necessarily be 180°; it would also be acceptable for this angle to be an obtuse angle, as shown in FIG. 3B (in other words, these directions may be generally in opposite directions). In this way, the balanced construction for the spring 122 is implemented by arranging the first spring portion 122C and the second spring portion 122D so that they are generally in opposite directions.

FIG. 4 is a simplified side view of the elastic reaction member 118, for explanation of the operation of the balanced construction of the spring 122 described above.

As shown in FIG. 4, a case is considered in which a pressure from the diaphragm 112 acts upon the contact portion 120 in the X axis direction, as shown by the arrow sign 208. In this case, the spring 122 is deformed from the shape shown by the solid line to the shape shown by the single dotted broken line. Moreover, in this case, the second spring portion 122D is rotationally shifted anti-clockwise from the fixed end 122B, as shown by the arrow sign 210. At the same time, the first spring portion 122C is rotationally shifted clockwise from the mutual connection point 122E, as shown by the arrow sign 212. Thus, in this manner, the first spring portion 122C and the second spring portion 122D are rotated in mutually opposite directions. Accordingly, at the contact portion 120, the rotation of the first spring portion 122C and the rotation of the second spring portion 122D are balanced out (to some extent, even if not perfectly), and the relative rotation (i.e., inclination) of the contact portion 120 with respect to the diaphragm 112 is kept down to an extremely small value. To put this in another manner, the contact portion 120 can be shifted almost parallel to the X axis direction, while hardly rotating at all. As a result, by the contact portion 120 thus being shifted while hardly rotating at all, the direction of the reaction force which is exerted by the contact portion 120 upon the diaphragm 112 is kept almost to the X axis direction, and thereby unnecessary deformation of the diaphragm 112 which originates in rotation or inclination of the contact portion 120 is prevented. And the result of this is that the noise component which originates in deformation of the diaphragm 112, included in the pressure difference—signal level characteristic of the pressure difference signal outputted from the transducer, is reduced, so that the accuracy of pressure difference detection is improved.

Various possible variant embodiments are possible for the balanced construction of the spring 122. FIG. 5 shows an elastic reaction member 1182 which is employed in one variant embodiment of the balanced construction of the spring 122.

With the elastic reaction member 1182 shown in FIG. 5, the spring 122 is formed in the shape of a letter "J", and thus the length of the second spring portion 122D is greater than the length of the first spring portion 122C. By contrast, with the elastic reaction member 118 shown in FIGS. 1 and 2, the spring 122 was formed in the shape of a letter "C" or in the shape of a letter "U", and thus the lengths of the first spring portion 122C and the second spring portion 122D were almost the same. With this letter "J" shape which is the shape of the spring 122 as shown in FIG. 5, it is easy to design the spring 122 so that the shift distance (i.e. the stroke length) in the X axis direction of the contact portion 120 becomes longer when a force of the same magnitude is exerted by the contact portion 120, as compared with the shape of a letter "C" or the shape of a letter "U" shown in FIGS. 1 and 2. If the stroke length of the contact portion 120 becomes longer, then the resolution for pressure difference detection is enhanced.

FIG. 6 shows an elastic reaction member 1184 which is employed in another variant embodiment of the balanced construction of the spring 122.

With the elastic reaction member 1184 shown in FIG. 6, overall, the spring 122 has the shape of a letter "V", so that both the first spring 122C and the second spring portion 122D have almost completely straight shapes. By contrast, with the elastic reaction member 118 shown in FIGS. 1 and 2, or with the elastic reaction member 1182 shown in FIG. 5, the spring 122 was formed in the shape of a letter "C", in the shape of a letter "U", or in the shape of a letter "J", and thus the first spring portion 122C and the second spring portion 122D were both curved into almost circular arcs. Thus, irrespective of whether the concrete construction of the spring 122 of a balanced construction is the shape of a letter "C", the shape of a letter "U", the shape of a letter "J", or the shape of a letter "V", it is possible to anticipate operation in which rotation of the contact portion 120 is suppressed, as explained with reference to FIG. 4.

FIG. 7 is a perspective view of an elastic reaction member 1186 which is employed in yet another variant embodiment of the balanced construction of the spring 122. And FIG. 8 is a side view of this elastic reaction member 1186 for explanation of the operation of the balanced construction shown in FIG. 7.

With any of the elastic reaction members 118, 1182, and 1184 described previously, the spring 122 is a plate spring which is bent in the direction in which its thickness is thinner (to put it in another manner, it is bent in a direction of rotation about, as a center, an axis which is orthogonal to the shift axis of the contact portion 120 (the X axis)). By contrast, with the elastic reaction member 1186 shown in FIG. 7, the spring 122 is a plate spring which is bent in the direction in which its thickness is greater (to put it in another manner, it is bent in a direction of rotation about, as a center, an axis which is parallel to the shift axis of the contact portion 120 (the X axis)). However, with the elastic reaction member 1186 shown in FIG. 7, the feature that the first spring portion 122C and the second spring portion 122D are disposed in generally opposite directions is the same as with the previously described elastic reaction members 118, 1182, and 1184. The pressure in the X axis direction shown by the arrow sign 208 acts from the diaphragm 112 (not shown in the figure) to the contact portion 120.

As shown in FIG. 8, when a pressure like that shown by the arrow sign 208 acts upon the contact portion 120, then, as shown by the arrow sign 210, the second spring portion 122D is rotated clockwise as seen from the fixed end 122B, and at the same time, the first spring portion 122C is rotated anti-clockwise as seen from the mutual connection point 122E, as shown by the arrow sign 212. Accordingly (in particular when the shift distance in the pressing direction is small), the rotation of the first spring portion 122C and the rotation of the second spring portion 122D are balanced out (to some extent, even if not perfectly), and the relative rotation of the contact portion 120 with respect to the diaphragm 112 (not shown in the figure) is kept low.

As described above, various types of variation are possible in the concrete structure of the balanced construction of the spring which can be employed as the elastic reaction member. Moreover, different variations are possible, even for where the elastic reaction member is disposed within the housing. For example, in the example shown in FIG. 1, the elastic reaction member 118 is disposed within the low pressure chamber 104. But, as a variant example, a design may also be employed in which the elastic reaction member is disposed within the high pressure chamber 108.

FIG. 9 is a sectional view of a differential pressure sensor according to a second embodiment of the present invention. And FIG. 10 is a sectional view of this differential pressure sensor taken along lines A-A in FIG. 9. Moreover, FIG. 11 is a perspective view of an elastic reaction member which is installed to this differential pressure sensor.

As shown in FIGS. 9 through 11, the principal point of difference between this differential pressure sensor 300 according to the second embodiment and the differential pressure sensor 100 according to the first embodiment shown in FIGS. 1 and 2 is the construction of the elastic reaction member. In other words, as most clearly shown in FIG. 11, the elastic reaction member 302 which is installed in this differential pressure sensor 300 according to the second embodiment has a construction in which two springs 306 and 308 which have substantially the same construction, size, and elastic characteristic are both connected to a single common contact portion 304. These two springs 306 and 308 are arranged so as to be symmetrical with respect to the contact portion 308 upon the coordinate plane (i.e. the Y-Z plane) which is orthogonal to the shift axis of the contact portion 304 (i.e. the X axis). As shown in FIG. 5, each of these springs 306 and 308 is a plate shaped or linear spring which is formed into the shape of a letter "J" (this might be the shape of a letter "C" or the shape of a letter "U" as shown in FIGS. 1 and 2, or the shape of a letter "V" as shown in FIG. 6). The springs 306 and 308 are connected to the common contact portion 304 by their respective loose ends 306A and 308A, and are fixed to the housing 102 by their respective fixed ends 306B and 306A, for example via bolts. Moreover, separately from the two springs 306 and 308, a branch portion 312 to which a shift mass 126 is fixed is connected to the contact portion 304. It should be understood that, as a variant example, it would also be acceptable to provide a branch portion at some spot upon the spring 306 or the spring 308, with the shift mass 126 being fixed thereto.

With the elastic reaction member 302 shown in FIG. 11, "balanced constructions" of two types are employed. The "balanced construction" of the first type is a "balanced construction of a spring" of the type already explained, in which the two springs 306 and 308 are employed. In other words, with the spring 306, its first and second spring portions 306C and 306D are arranged so as generally to extend in mutually opposite directions upon the Y-Z plane. And, with the spring 308 as well, its first and second spring portions 308C and 308D are also arranged so as generally to extend in mutually opposite directions upon the Y-Z plane. Accordingly, each of the springs 306 and 308 individually is able to exhibit the type of operation already explained with reference to FIG. 4. And, in addition to this, as a "balanced construction" of a second type, a "balanced construction in which a plurality of springs are combined" is employed. In other words, this "balanced construction in which a plurality of springs are combined" is implemented as a construction in which the two springs 306 and 308 are arranged symmetrically in the Y-Z plane with respect to the contact portion 308. To put this in another manner, in this type of symmetrical configuration of the two springs 306 and 308, the angle subtended upon the Y-Z plane by the directions 402 and 404 in which the two springs 306 and 306 extend from the contact portion 304 (and in particular by the first spring portions 306C and 308C which are connected to that contact portion 304) is 180°. It should be understood that this angle which the directions 402 and 404 of the two springs 306 and 308 subtend upon the Y-Z plane need not necessarily be 180° (i.e. they need not extend in perfectly opposite directions); it may be an obtuse angle (in other words, they may extend in generally opposite directions).

FIG. 12 is a simplified side view of an elastic reaction member 302, for explanation of the operation of the balanced construction described above, in which a plurality of springs (for example, two springs) are combined.

As shown in FIG. 12, when a pressure from the diaphragm 112 (not shown in the figure) is applied to the contact portion 304 as shown by the arrow sign 208, then the two springs 306 and 308 are deformed from their shape shown by the solid line to their shape shown by the single dotted broken line. At this time, the portions 306C and 308C of the two springs 306 and 308 which are connected to the contact portion 304 (i.e. their first spring portions) are made to rotate in mutually opposite directions as seen from their fixed ends 306B and 308B, as shown by the arrow signs 406 and 408, and these two rotations balance one another out (i.e. mutually cancel one another) (at least to some extent, even if not absolutely perfectly), so that rotation of the contact portion 304 with respect to the diaphragm 112 is suppressed. As a result, the contact portion 304 is substantially shifted in parallel in the direction of the X axis, as shown by the arrow sign 410.

Furthermore, not only is the rotation of the contact portion 304 with respect to the diaphragm 112 suppressed, but also horizontal deviation of the contact portion 304 with respect to the diaphragm 112 (i.e., shifting in a direction which is orthogonal to the X axis) is suppressed. In other words since, with only the "balanced construction of a spring" already explained with reference to FIG. 4, a slight horizontal deviation of the contact portion 120 takes place as shown by the arrow sign 214 in FIG. 4, accordingly a slight amount of sliding friction is engendered between the contact portion 120 and the diaphragm 112. By contrast, according to a "balanced construction in which a plurality of springs are employed" as shown in FIG. 11, since it is arranged for the plurality of springs 306 and 308 to shift in mutually opposite directions orthogonally to the X axis, accordingly these two shifts balance one another out (at least to some extent, even if not absolutely perfectly), so that horizontal deviation of the contact portion 304 is suppressed, and thus sliding between the contact portion 120 and the diaphragm 112 is suppressed. As a result, the sliding friction between the contact portion 120 and the diaphragm 112 is suppressed, and the hysteresis characteristic of the pressure difference signal which originates in this sliding friction is suppressed to an extremely small level, so that the accuracy of pressure difference detection is enhanced.

Many further variations upon "a balanced construction in which a plurality of springs are combined" are possible. FIG.

13 shows an elastic reaction member 3022 which employs one variant embodiment of such a balanced construction in which a plurality of springs are combined.

As shown in FIG. 13, each of the two springs 306 and 308 is a plate spring which is bent in the direction of its width, as shown in FIG. 7, into the shape of a letter "C", "U", "J", or "V". These two springs 306 and 308 are both connected to a common contact portion 304, and are arranged in directions which mutually subtend an obtuse angle upon the Y-Z plane (for example, symmetrically with respect to the contact portion 304).

FIG. 14 shows an elastic reaction member 3024 which is employed in another variant embodiment of this balanced construction in which a plurality of springs are combined.

With this elastic reaction member 3024 shown in FIG. 14, a "balanced construction of a spring" such as already explained is not employed for each of the two springs 306 and 308. However, the first spring portions 306C and 308C are both connected to a common contact portion 304, and are arranged in directions which mutually subtend an obtuse angle upon the Y-Z plane (for example, symmetrically with respect to the contact portion 304). In this manner, even if only a "balanced construction in which a plurality of springs are employed" is used, but not a "balanced construction of a spring", still an operation such as that explained with reference to FIG. 12 may be obtained.

FIG. 15 shows an elastic reaction member 3026 which is employed in yet another variant embodiment of this balanced construction in which a plurality of springs are combined.

With the elastic reaction member 3026 shown in FIG. 15, three springs 306, 308, and 310 are all connected to a common contact portion 304 (and are, for example, arranged symmetrically with respect to that contact portion 304). When the contact portion 304 shifts along the X axis, the rotations and the horizontal deviations are balanced between these three springs 306, 308, and 310, and thus the contact portion 304 substantially shifts in parallel along the X axis.

As yet another variant example, which is not illustrated by any figure, it would also be possible to employ a balanced construction in which four or more springs were combined. In other words, these four or more springs would be connected to a single common contact portion, and, for each of these springs, at least one other spring would be arranged in a direction which mutually subtends an obtuse angle therewith upon the Y-Z plane (for example, would be arranged symmetrically thereto with respect to the contact portion 304). It would be acceptable to employ a "balanced construction of a spring" for each of these springs, or alternatively it would also be acceptable not to employ any such construction.

Although several preferred embodiments of the present invention have been explained above, the scope of the present invention is not to be considered as being limited only to those described embodiments; the present invention may be implemented in various other manners, provided that its gist is not departed from.

Figure 1:
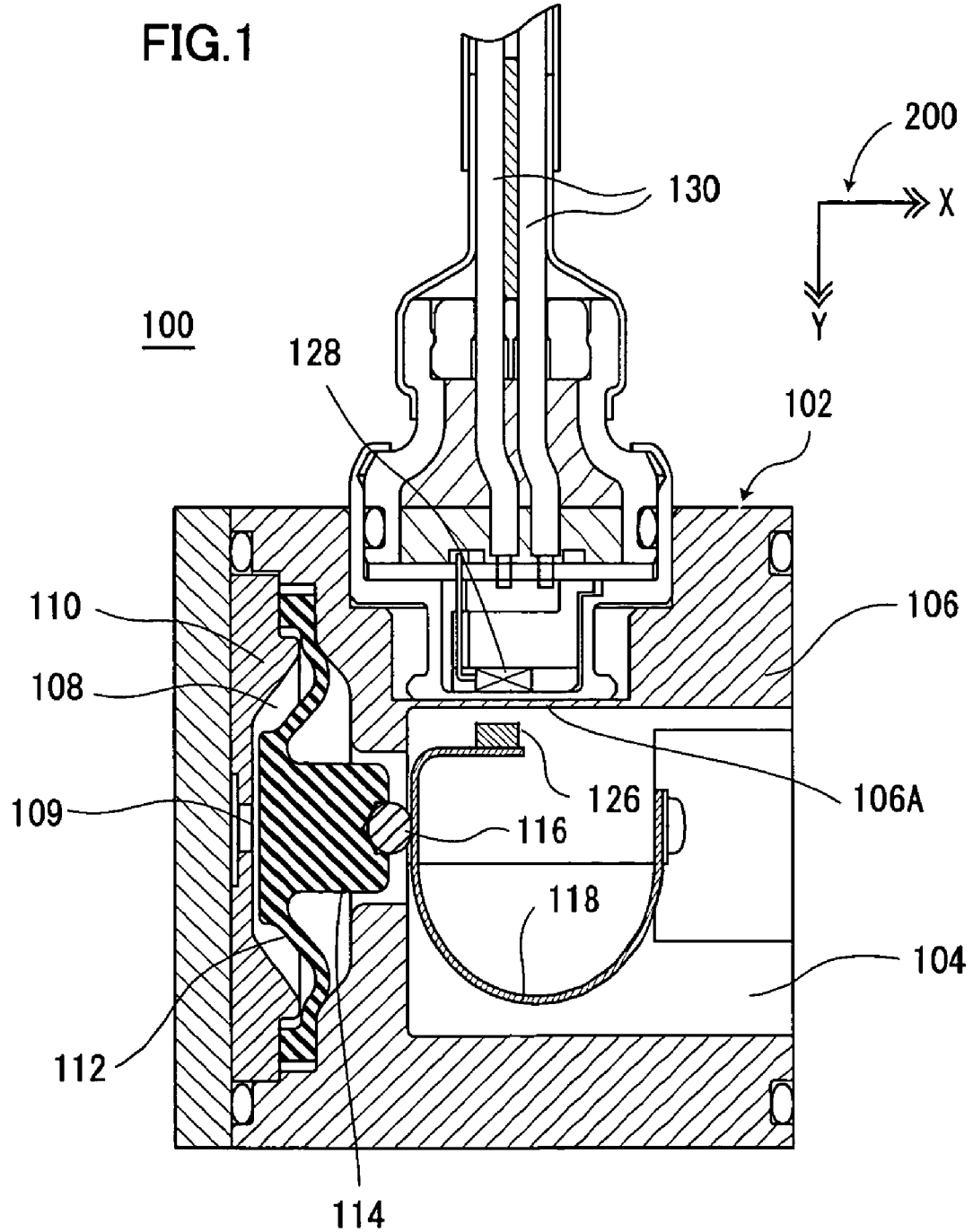
FIG. 1 is a sectional view of a differential pressure sensor according to a first embodiment of the present invention.
Figure 2:
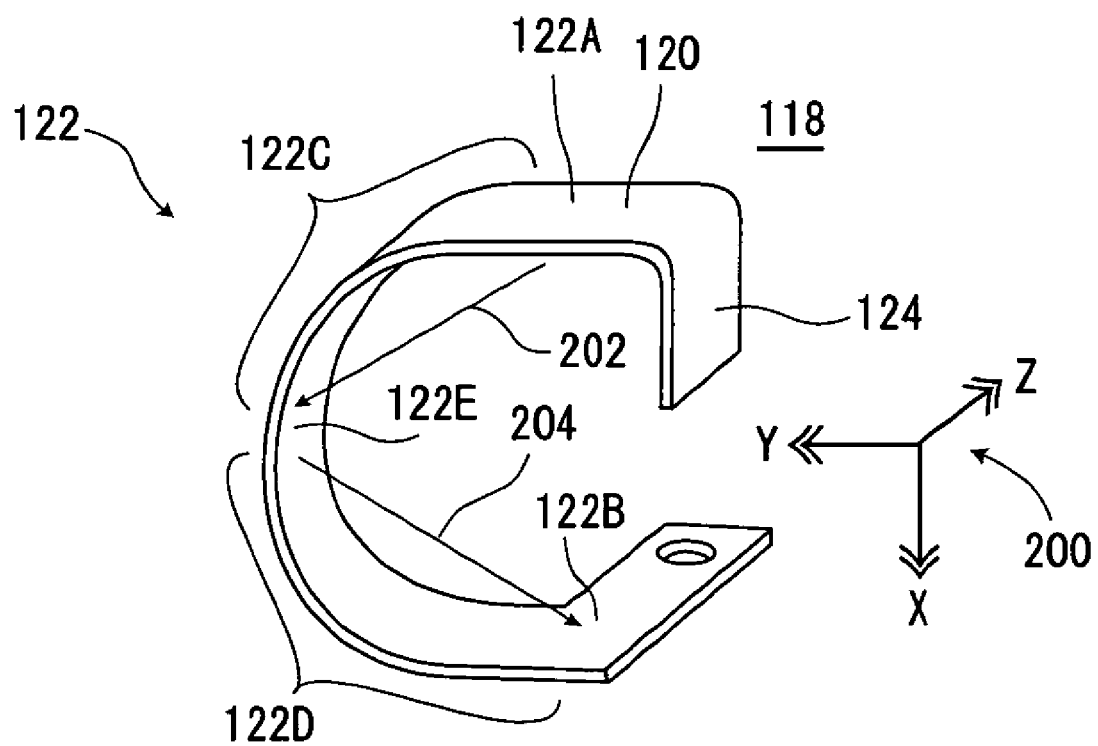
FIG. 2 is a perspective view of an elastic reaction member which is fitted to this differential sensor according to the first embodiment.
Figure 3A:
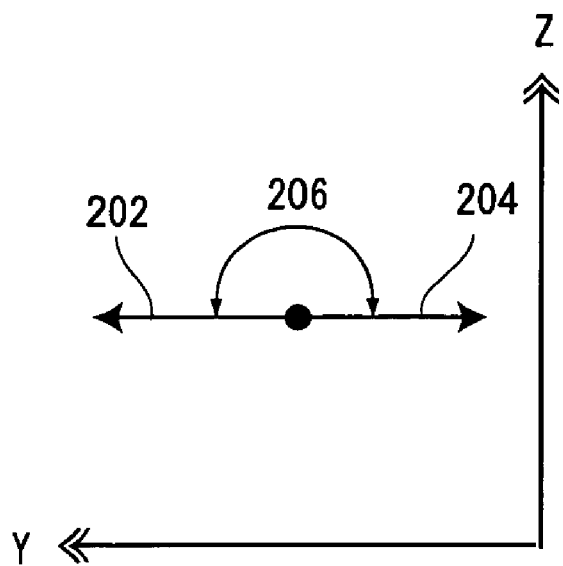
FIG. 3 is a figure for explanation of a balanced construction for a spring, which is implemented by disposing a first and a second spring portion in generally opposite directions.
Figure 3B:
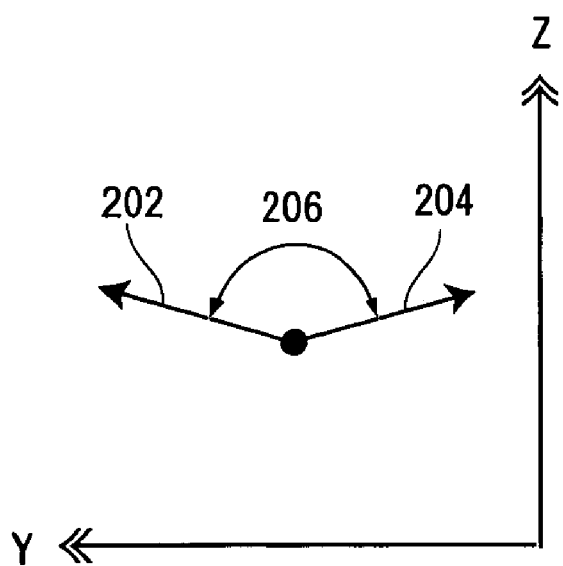
Figure 4:
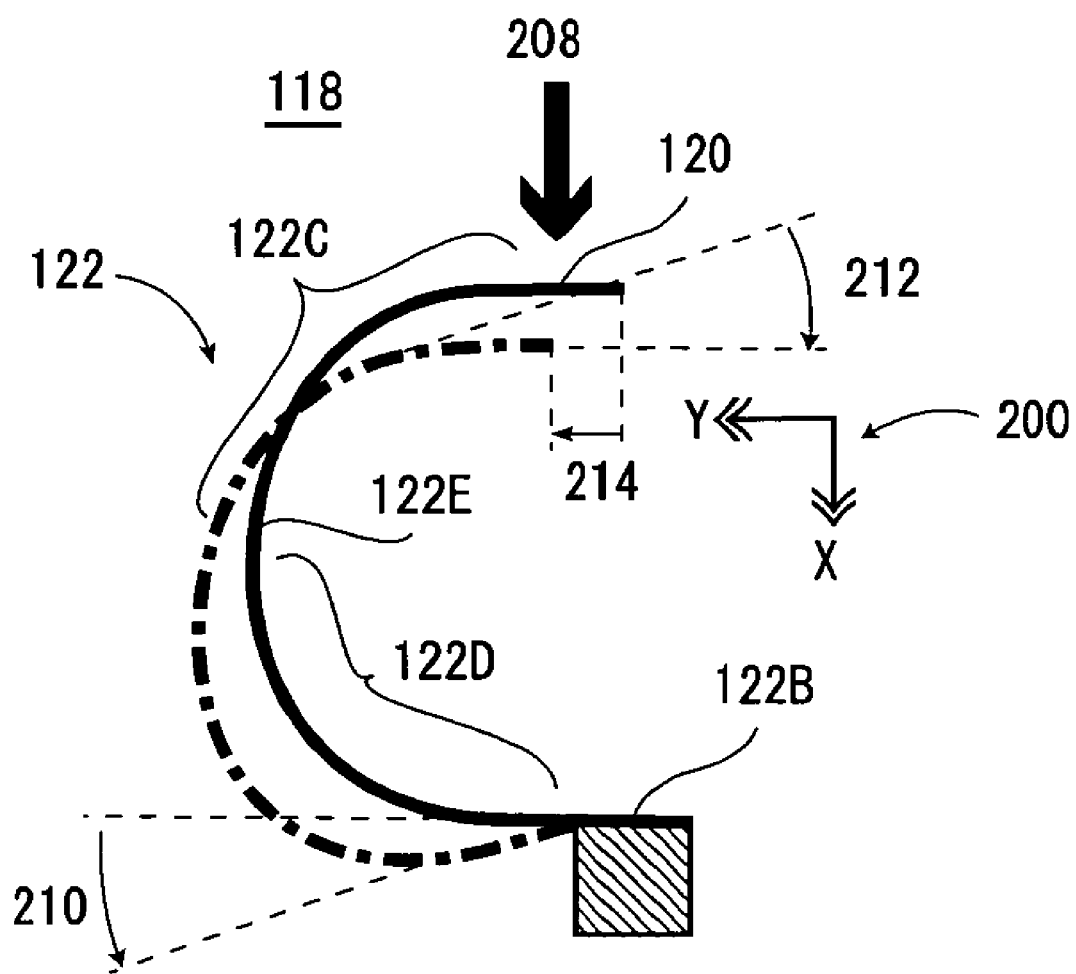
FIG. 4 is a side view of the elastic reaction member, for explanation of the operation of this balanced construction of the spring.
Figure 5:
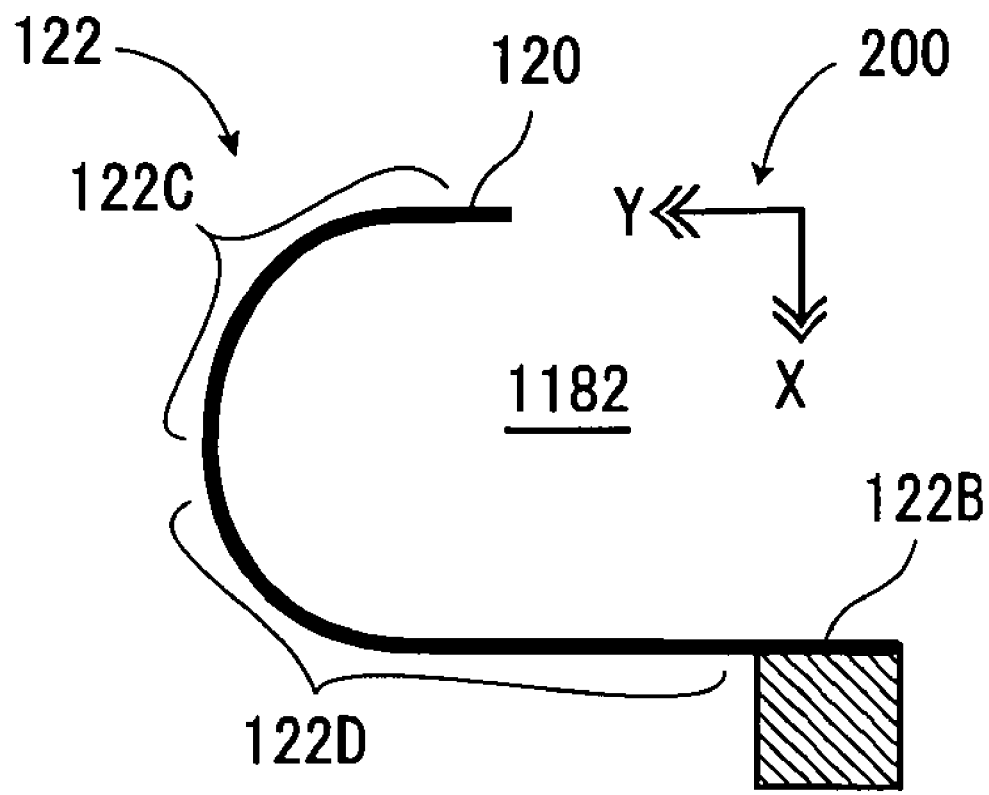
FIG. 5 is a side view of an elastic reaction member, for explanation of a variant embodiment of a balanced construction of a spring.
Figure 6:
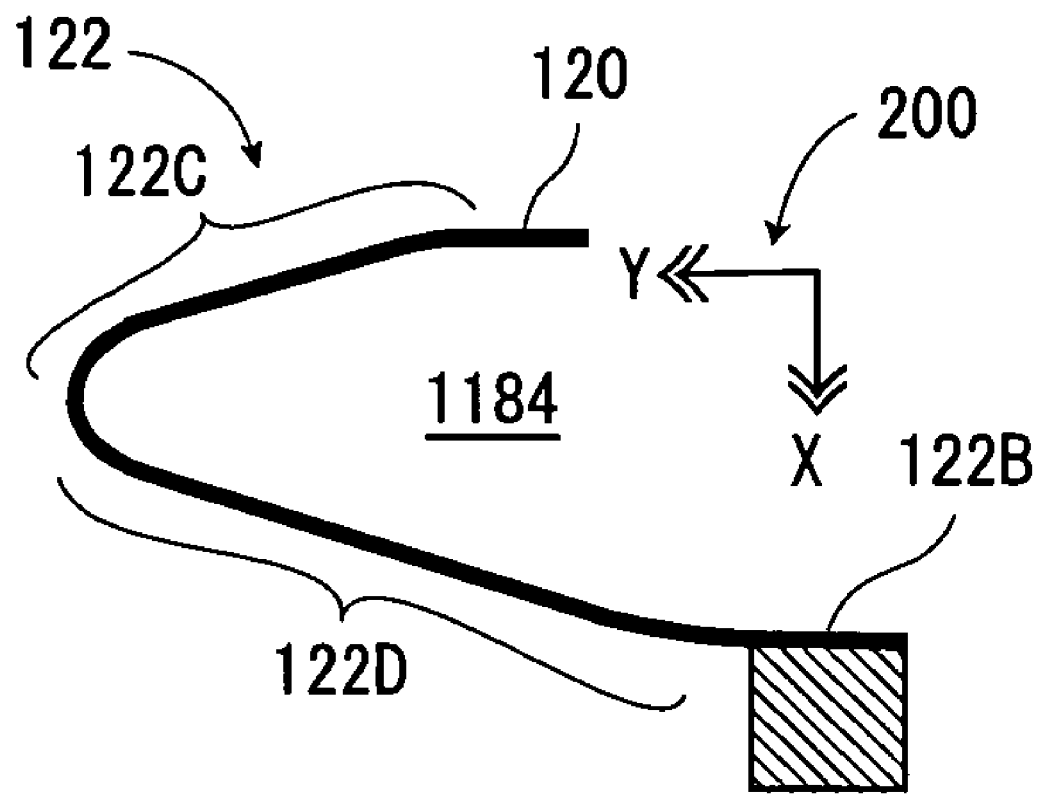
FIG. 6 is a side view of an elastic reaction member, for explanation of another variant embodiment of a balanced construction of a spring.
Figure 7:
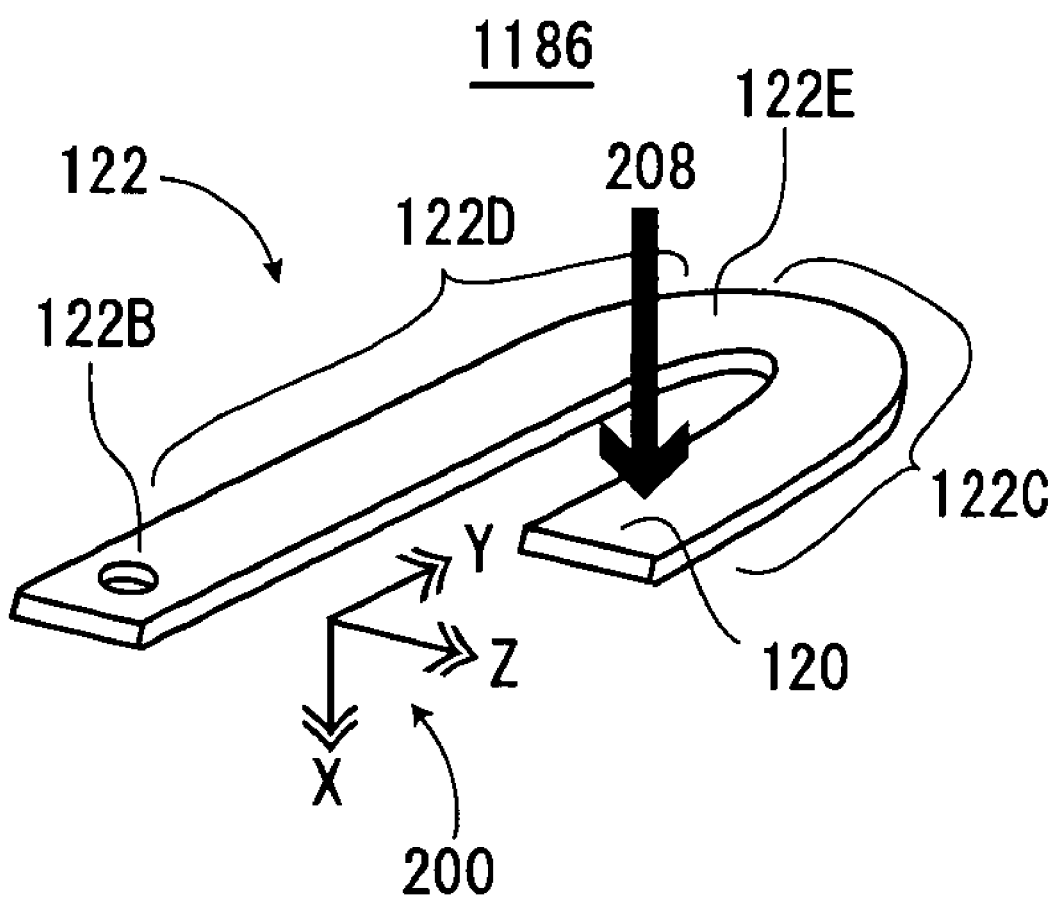
FIG. 7 is a perspective view of an elastic reaction member which is employed in another variant embodiment of a balanced construction of a spring.
Figure 8:
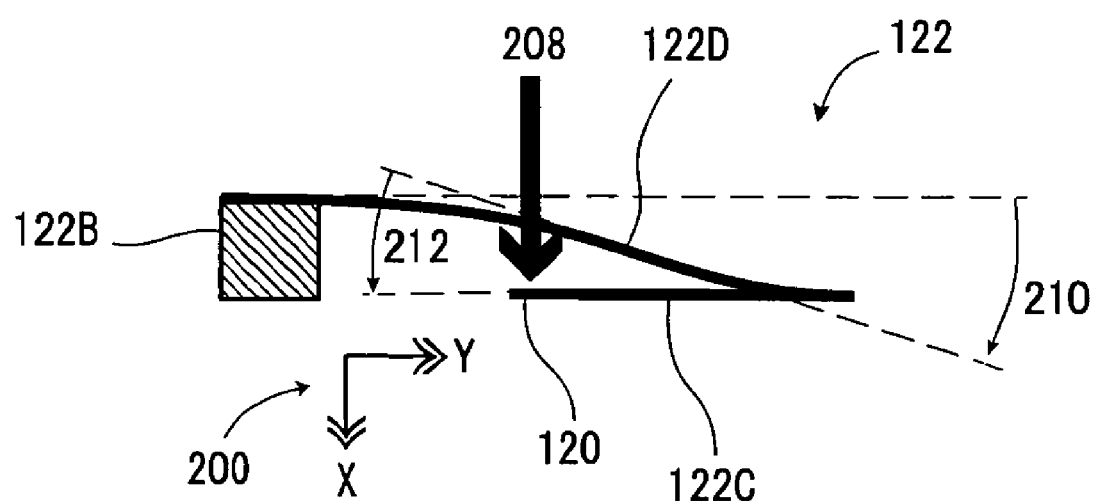
FIG. 8 is a side view of an elastic reaction member 1186, for explanation of the operation of the balanced construction shown in FIG. 6.
Figure 9:
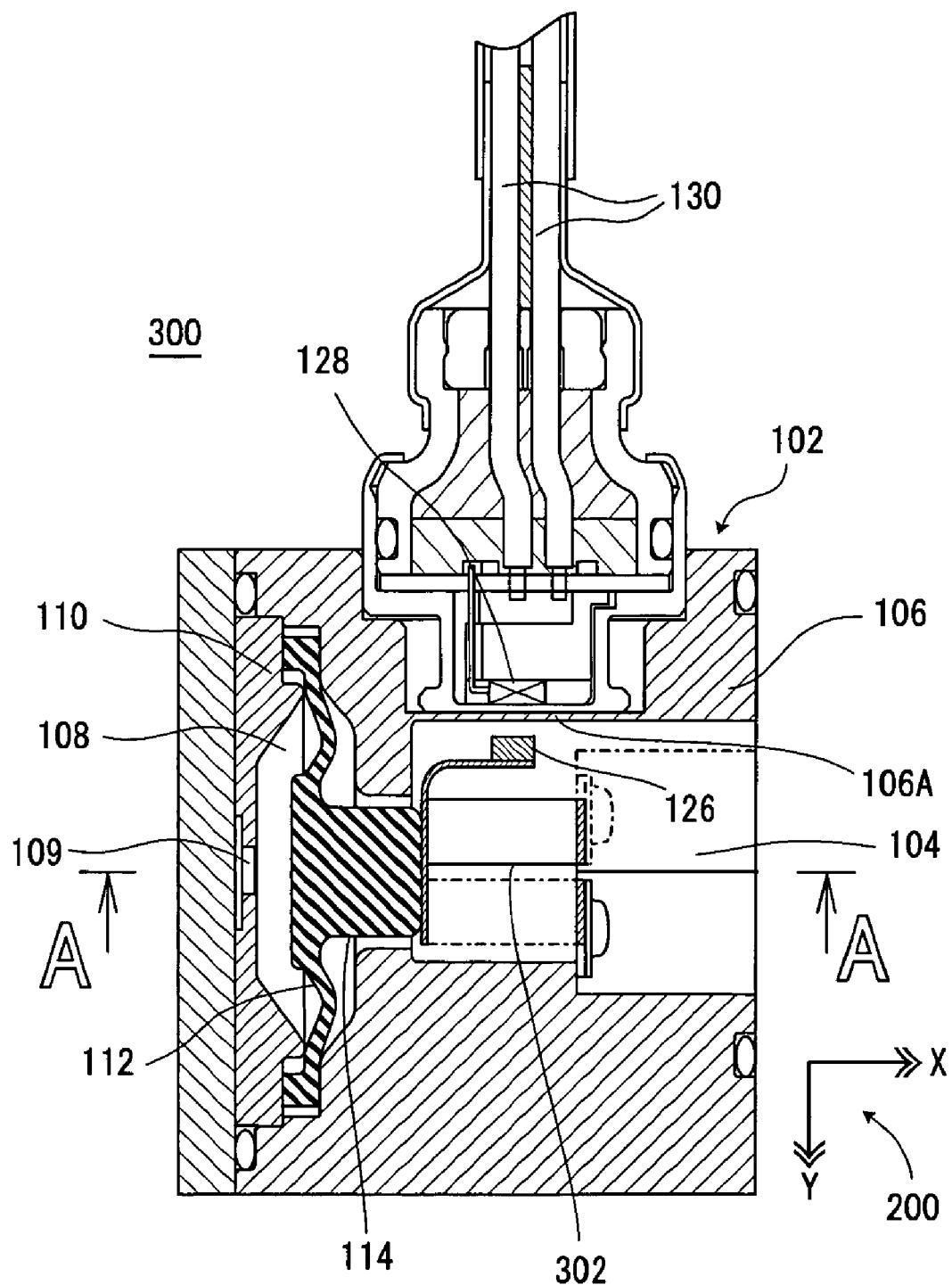
FIG. 9 is a sectional view of a differential pressure sensor according to a second embodiment of the present invention.
Figure 10:
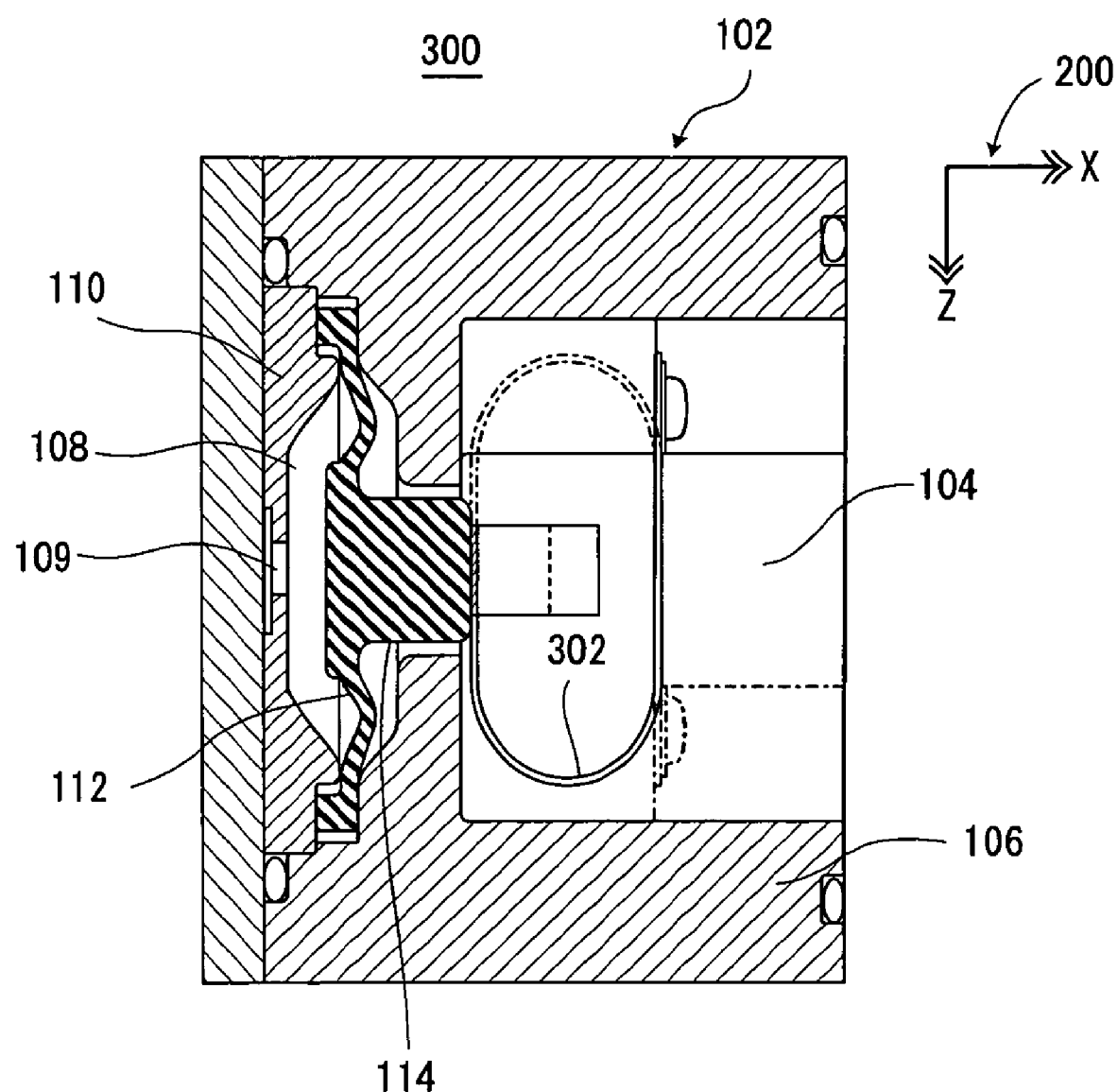
FIG. 10 is a sectional view of this differential pressure sensor according to the second embodiment, taken along lines A-A in FIG. 9.
Figure 11:
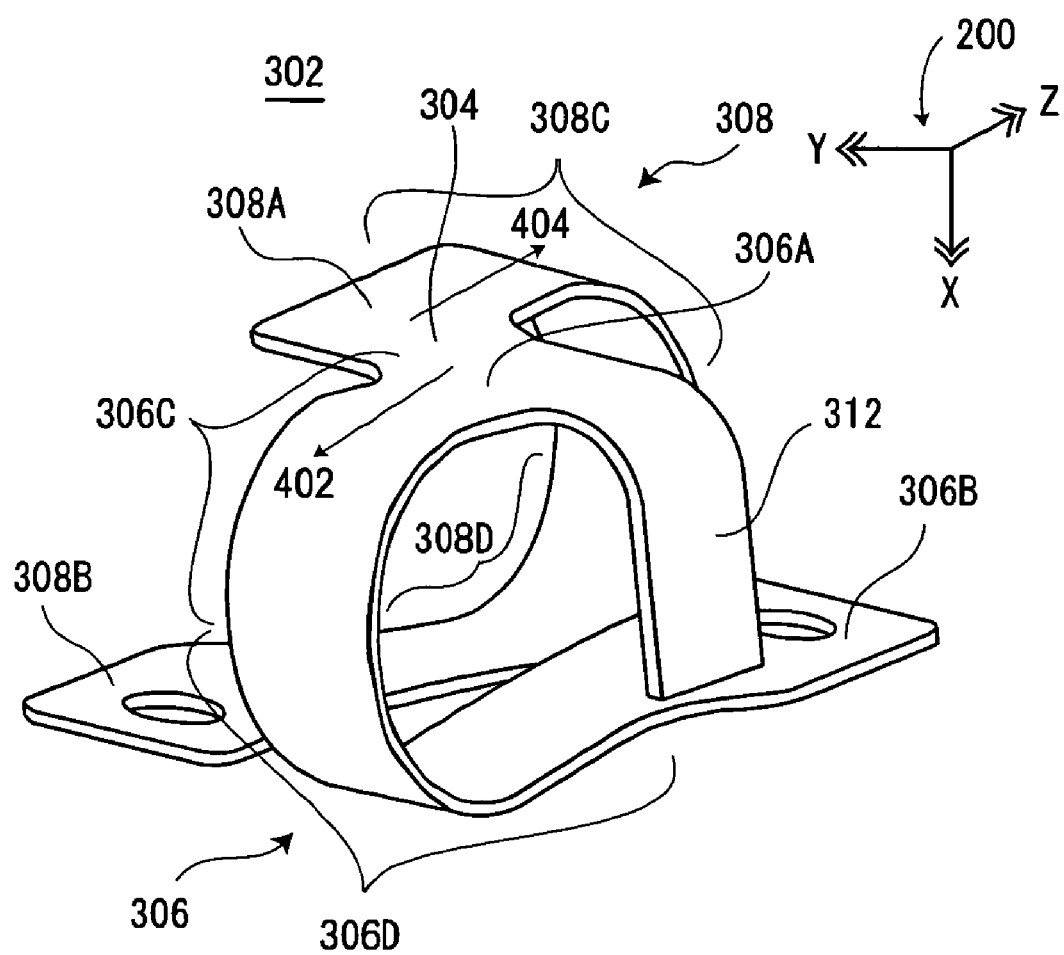
FIG. 11 is a perspective view of an elastic reaction member which is installed in this differential pressure sensor according to the second embodiment.
Figure 12:
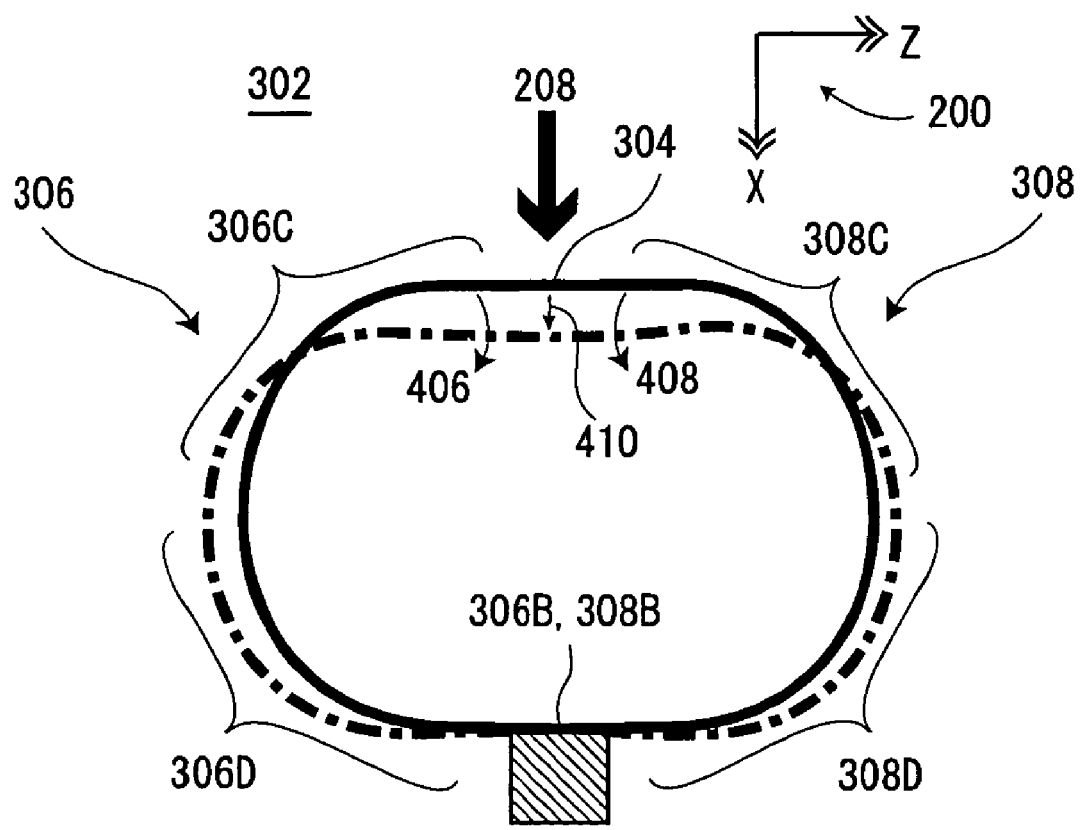
FIG. 12 is an abbreviated side view of the elastic reaction member, for explanation of the operation of this balanced construction in which a plurality of springs are combined.
Figure 13:
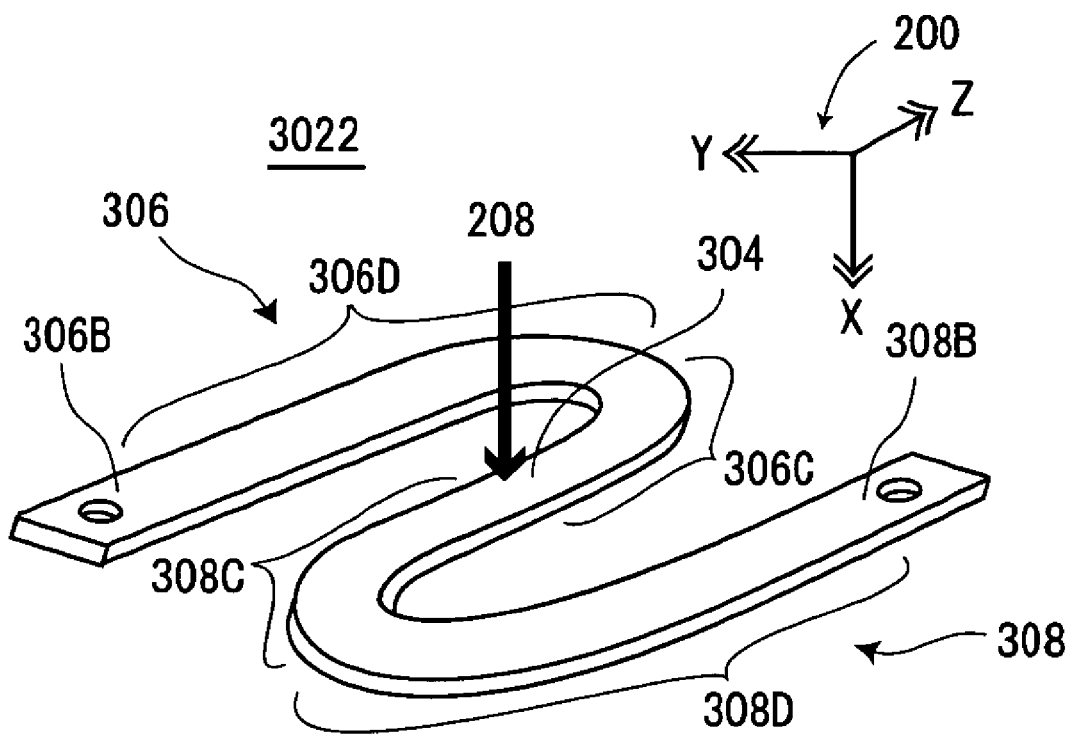
FIG. 13 is a perspective view of an elastic reaction member which is employed in one variant embodiment of this balanced construction in which a plurality of springs are combined.
Figure 14:
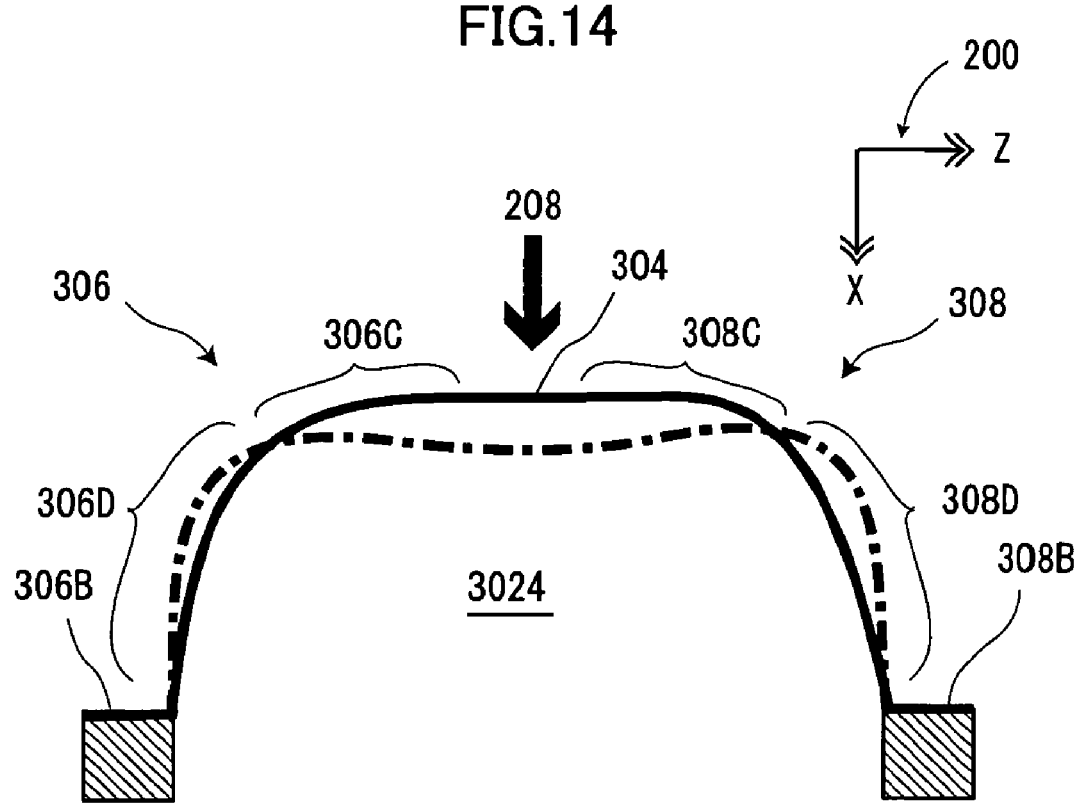
FIG. 14 is a side view of an elastic reaction member which is employed in another variant embodiment of this balanced construction in which a plurality of springs are combined.
Figure 15:
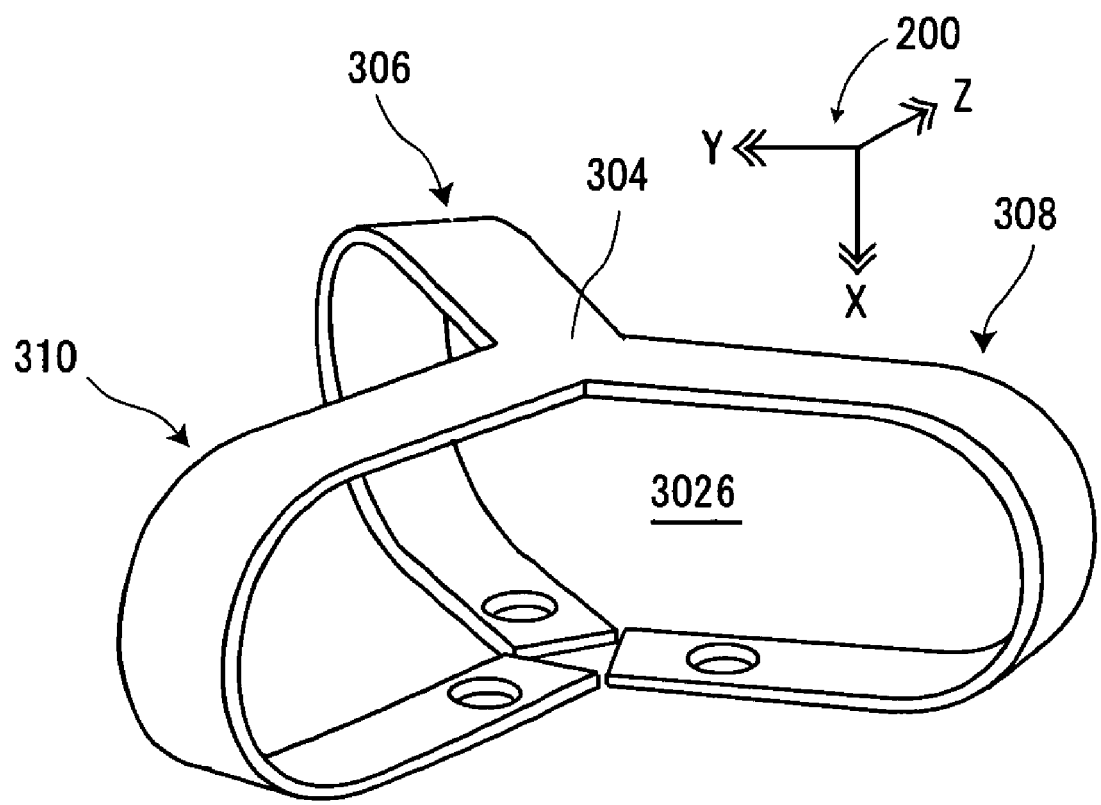
FIG. 15 is a side view of an elastic reaction member which is employed in yet another variant embodiment of this balanced construction in which a plurality of springs are combined.

The invention claimed is:

1. A differential pressure sensor, comprising:
a housing comprising a first wall which defines a first chamber and a second wall which defines a second chamber;
a diaphragm disposed within said housing between said first chamber and said second chamber, and comprising a movable part which can be moved along a certain shift axis (X) upon receipt of a pressure difference between said first chamber and said second chamber;
an elastic reaction member which applies an elastic reaction force to said movable part; and
a transducer which outputs an electrical signal according to a position of said movable part along said shift axis;
wherein:
said elastic reaction member comprises:
a contact portion which contacts said movable part and is shiftable together with said movable part; and
a plate shaped or linear spring comprising a loose end which is connected to said contact portion, and a fixed end which is connected to said housing;
said spring comprises a first spring portion and a second spring portion which are connected in series between said loose end and said fixed end, with said first spring portion extending in a first direction from said loose end to a mutual connection point between said first spring portion and said second spring portion, and said second spring portion extending in a second direction from said mutual connection point to said fixed end; and said first spring portion and said second spring portion are disposed so that said first direction and said second direction mutually subtend an obtuse angle upon a two dimensional coordinate plane (Y-Z) which is orthogonal to said shift axis; and a length of said second spring portion is greater than a length of said first spring portion.

2. A differential pressure sensor according to claim 1, wherein said spring is formed in a shape of a letter "C", "U", "V", or "J".

3. A differential pressure sensor according to claim 1, wherein:

said elastic reaction member comprises a plurality of said springs, each of which has one of said loose ends which is connected in common to said contact portion; and said plurality of springs are arranged so that a direction that each spring among said plurality of springs extends and a direction that at least one other spring extends from said contact portion mutually subtend an obtuse angle upon said two dimensional coordinate plane.

4. A differential pressure sensor according to claim 3, wherein said plurality of springs are arranged symmetrically with respect to said contact portion.

5. A differential pressure sensor comprising:

a housing comprising a first wall which defines a first chamber and a second wall which defines a second chamber;

a diaphragm disposed within said housing between said first chamber and said second chamber, and comprising a movable part which can be moved along a certain shift axis (X) upon receipt of a pressure difference between said first chamber and said second chamber;

an elastic reaction member which applies an elastic reaction force to said movable part; and a transducer which outputs an electrical signal according to a position of said movable part along said shift axis;

wherein:

said elastic reaction member comprises:

a contact portion which contacts said movable part and is shiftable together with said movable part; and a plate shaped or linear spring comprising a loose end which is connected to said contact portion, and a fixed end which is connected to said housing;

said spring comprises a first spring portion and a second spring portion which are connected in series between said loose end and said fixed end, with said first spring portion extending in a first direction from said loose end to a mutual connection point between said first spring portion and said second spring portion, and said second spring portion extending in a second direction from said mutual connection point to said fixed end;

said first spring portion and said second spring portion are disposed so that said first direction and said second direction mutually subtend an obtuse angle upon a two dimensional coordinate plane (Y-Z) which is orthogonal to said shift axis;

said elastic reaction member comprises a plurality of said springs, each of which has one of said loose ends which is connected in common to said contact portion; and said plurality of springs are arranged so that a direction that each spring among said plurality of springs extends and a direction that at least one other spring extends from said contact portion, mutually subtend an obtuse angle upon said two dimensional coordinate plane, and so that said contact portion can shift almost parallel to itself without rotation.

6. A differential pressure sensor according to claim 1, wherein:

said elastic reaction member further comprises a branch portion which is connected to said contact portion, and which is separate from said spring; and said transducer is adapted to output said electrical signal in correspondence to a position of said branch portion.

7. A differential pressure sensor according to claim 6, wherein:

said elastic reaction member is disposed in said first chamber or in said second chamber; and said transducer comprises:

a shift mass which is fitted to said branch portion within said first chamber or said second chamber; and a detection element disposed exterior to said first chamber and said second chamber, which detects a position of said shift mass within said first chamber or said second chamber through said first wall or said second wall in a non-contact manner.

8. A differential pressure sensor according to claim 1, wherein said spring comprises a branch portion, and a portion of said transducer is fixed upon said branch portion.

9. A differential pressure sensor according to claim 3, wherein:

said first chamber is a low pressure chamber, and said second chamber is a high pressure chamber;

said elastic reaction member is disposed within said low pressure chamber;

said elastic reaction member further comprises a branch portion, separate from said springs, which is connected to said contact portion;

said transducer comprises:

a shift mass which is fitted to said branch portion; and a detection element disposed exterior to said low pressure chamber and said high pressure chamber, which detects a position of said shift mass through a wall of said low pressure chamber in a non-contact manner;

each of said plurality of springs is formed in a shape of a letter "C", "U", "V", or "J";

each of said plurality of springs comprises a first spring portion and a second spring portion which are connected together in series between said loose end thereof and said fixed end thereof;

said first spring portion extends in a first direction from said loose end to a mutual connection point between said first and second spring portions; said second spring portion extends in a second direction from said mutual connection point to said fixed end; and a length of said second spring portion is greater than a length of said first spring portion; and said plurality of springs are arranged symmetrically with respect to said contact portion.

10. A differential pressure sensor according to claim 2, wherein:

said elastic reaction member further comprises a branch portion which is connected to said contact portion, and which is separate from said spring; and said transducer is adapted to output said electrical signal in correspondence to a position of said branch portion.

11. A differential pressure sensor according claim 2, wherein said spring comprises a branch portion, and a portion of said transducer is fixed upon said branch portion.

12. A differential pressure sensor according to claim 3, wherein:

said elastic reaction member further comprises a branch portion which is connected to said contact portion, and which is separate from said spring; and said transducer is adapted to output said electrical signal in correspondence to a position of said branch portion.

13. A differential pressure sensor according claim 3, wherein said spring comprises a branch portion, and a portion of said transducer is fixed upon said branch portion.

14. A differential pressure sensor according to claim 4, wherein:
   said elastic reaction member further comprises a branch portion which is connected to said contact portion, and which is separate from said spring; and
   said transducer is adapted to output said electrical signal in correspondence to a position of said branch portion.

15. A differential pressure sensor according claim 4, wherein said spring comprises a branch portion, and a portion of said transducer is fixed upon said branch portion.

16. A differential pressure sensor according to claim 5, wherein:
   said elastic reaction member further comprises a branch portion which is connected to said contact portion, and which is separate from said spring; and
   said transducer is adapted to output said electrical signal in correspondence to a position of said branch portion.

17. A differential pressure sensor according claim 5, wherein said spring comprises a branch portion, and a portion of said transducer is fixed upon said branch portion.

18. A differential pressure sensor according to claim 10, wherein:
   said elastic reaction member is disposed in said first chamber or in said second chamber; and said transducer comprises:
   a shift mass which is fitted to said branch portion within said first chamber or said second chamber; and
   a detection element disposed exterior to said first chamber and said second chamber, which detects a position of said shift mass within said first chamber or said second chamber through said first wall or said second wall in a non-contact manner.

19. A differential pressure sensor according to claim 12, wherein:
   said elastic reaction member is disposed in said first chamber or in said second chamber; and said transducer comprises:
   a shift mass which is fitted to said branch portion within said first chamber or said second chamber; and
   a detection element disposed exterior to said first chamber and said second chamber, which detects a position of said shift mass within said first chamber or said second chamber through said first wall or said second wall in a non-contact manner.

20. A differential pressure sensor according to claim 14, wherein:
   said elastic reaction member is disposed in said first chamber or in said second chamber; and said transducer comprises:
   a shift mass which is fitted to said branch portion within said first chamber or said second chamber; and
   a detection element disposed exterior to said first chamber and said second chamber, which detects a position of said shift mass within said first chamber or said second chamber through said first wall or said second wall in a non-contact manner.

* * * * *